United States Patent
Pilkington (10) Patent No.: US 9,921,887 B2
(45) Date of Patent: Mar. 20, 2018

(54) ACCOMODATING SYNCHRONOUS OPERATIONS IN AN ASYNCHRONOUS SYSTEM

(71) Applicant: INTERNATIONAL BUSINESS MACHINES CORPORATION, Armonk, NY (US)

(72) Inventor: Adam J. Pilkington, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 14/967,575

(22) Filed: Dec. 14, 2015

(65) Prior Publication Data

US 2017/0090998 A1    Mar. 30, 2017

(30) Foreign Application Priority Data

Sep. 30, 2015    (GB) .................................. 1517261.2

(51) Int. Cl.
*G06F 9/46* (2006.01)
*G06F 9/52* (2006.01)

(52) U.S. Cl.
CPC ..................................... *G06F 9/52* (2013.01)

(58) Field of Classification Search
None
See application file for complete search history.

(56) References Cited

U.S. PATENT DOCUMENTS

| | | | |
|---|---|---|---|
| 7,248,603 B1* | 7/2007 | Grunkemeyer | G06F 9/4425 370/465 |
| 8,478,818 B2 | 7/2013 | Shkvarcuk et al. | |
| 8,607,206 B2 | 12/2013 | Freeman et al. | |
| 2004/0064570 A1* | 4/2004 | Tock | H04L 67/325 709/228 |
| 2009/0292765 A1* | 11/2009 | Leedberg | G06F 9/541 709/203 |
| 2011/0173595 A1 | 7/2011 | Gustafsson et al. | |
| 2013/0152104 A1* | 6/2013 | Paperin | G06F 9/541 718/107 |

* cited by examiner

*Primary Examiner* — Sisley Kim
(74) *Attorney, Agent, or Firm* — Heslin Rothenberg Farley & Mesiti P.C.

(57) ABSTRACT

A method, system, and computer program product includes a processor storing, in an order of invocation, a plurality of operations in an ordered list. The first entry is a primary operation and that is a synchronous operation and the subsequent entries include an asynchronous operation, and the secondary operations are required to complete before the primary operation can complete. The processor invokes, in the order of invocation, the plurality of operations. Based on invoking the primary operation and the secondary operations, the processor stores information about the operations as content in a stack. The processor determines that the primary operation can be completed by analyzing a portion of the content of the stack.

18 Claims, 7 Drawing Sheets

STACK A    STACK B    STACK C    STACK D    STACK E

ACCOMODATING SYNCHRONOUS OPERATIONS IN AN ASYNCHRONOUS SYSTEM

PRIOR FOREIGN APPLICATION

This application claims priority from United Kingdom (GB) patent application number 1517261.2, filed Sep. 30, 2015, which is hereby incorporated herein by reference in its entirety.

BACKGROUND

In computer programming, an application programming interface (API) is a set of routines, protocols, and tools for building software applications and services. An API expresses a software component in terms of its operations, inputs, outputs, and underlying types.

If an API call is synchronous, it means that code execution will block (or wait) for the API call to return before continuing. This means that until a response is returned by the API, the application will not execute any further, which could be perceived by the user as latency or performance lag.

Asynchronous API calls, on the other hand, do not block (or wait) for the API call to return from the server. Execution continues on in the program, and when the call returns from the server, a "callback" function is executed.

Thus, two main communication models exist for communication between a requester and a service (such as a web service for example): a synchronous communication model and an asynchronous communication model. The two models may not work in conjunction and, as a consequence, there may be no way for a synchronous requester to communicate with an asynchronous service, for example. It may therefore be desirable to cater for synchronous operation calls in an asynchronous system or communication model.

Systems have been devised which handle asynchronous operations or API calls, but they require modification of the synchronous operation or API call. They also require the use of proprietary operations and so do not cater for the re-use of conventional/existing operations.

SUMMARY

Shortcomings of the prior art are overcome and additional advantages are provided through the provision of a computer program product for accommodating synchronous operations in an asynchronous system. The computer program product comprises a storage medium readable by a processing circuit and storing instructions for execution by the processing circuit for performing a method. The method includes, for instance: storing, by a processor, in an order of invocation, a plurality of operations in an ordered list, wherein the first entry in the ordered list comprises a primary operation and the primary operation is a synchronous operation, wherein subsequent entries in the ordered list comprise secondary operations, and the secondary operations comprise an asynchronous operation, and wherein the secondary operations are required to complete before the primary operation can complete; invoking, by the processor, in the order of invocation, the plurality of operations; based on invoking the primary operation, storing, by the processor, as content of a stack, information about the primary operation; based on invoking the secondary operations, storing, by the processor, as the content of the stack, information about the secondary operations, wherein the information about the secondary operations comprises information about the asynchronous operation; and determining, by the processor, that the primary operation can be completed, wherein the determining comprises analyzing a portion of the content of the stack.

Shortcomings of the prior art are overcome and additional advantages are provided through the provision of a method of accommodating synchronous operations in an asynchronous system. The method includes, for instance: storing, by a processor, in an order of invocation, a plurality of operations in an ordered list, wherein the first entry in the ordered list comprises a primary operation and the primary operation is a synchronous operation, wherein subsequent entries in the ordered list comprise secondary operations, and the secondary operations comprise an asynchronous operation, and wherein the secondary operations are required to complete before the primary operation can complete; invoking, by the processor, in the order of invocation, the plurality of operations; based on invoking the primary operation, storing, by the processor, as content of a stack, information about the primary operation; based on invoking the secondary operations, storing, by the processor, as the content of the stack, information about the secondary operations, wherein the information about the secondary operations comprises information about the asynchronous operation; and determining, by the processor, that the primary operation can be completed, wherein the determining comprises analyzing a portion of the content of the stack.

Shortcomings of the prior art are overcome and additional advantages are provided through the provision of a system for accommodating synchronous operations in an asynchronous system. The system includes a memory, one or more processor in communication with the memory, and program instructions executable by the one or more processor via the memory to perform a method. The method includes, for instance: storing, by a processor, in an order of invocation, a plurality of operations in an ordered list, wherein the first entry in the ordered list comprises a primary operation and the primary operation is a synchronous operation, wherein subsequent entries in the ordered list comprise secondary operations, and the secondary operations comprise an asynchronous operation, and wherein the secondary operations are required to complete before the primary operation can complete; invoking, by the processor, in the order of invocation, the plurality of operations; based on invoking the primary operation, storing, by the processor, as content of a stack, information about the primary operation; based on invoking the secondary operations, storing, by the processor, as the content of the stack, information about the secondary operations, wherein the information about the secondary operations comprises information about the asynchronous operation; and determining, by the processor, that the primary operation can be completed, wherein the determining comprises analyzing a portion of the content of the stack.

Methods and systems relating to one or more aspects are also described and claimed herein. Further, services relating to one or more aspects are also described and may be claimed herein.

In an embodiment of the present invention, the method further includes: associating, by the processor, the primary operation with a primary indicator, wherein setting the primary indicator indicates that the primary operation has completed; and based on the determining that the primary operation can be completed, setting, by the processor, the primary indicator. In another embodiment of the present invention, the method further includes: associating, by the processor, the secondary operations with secondary indicators, wherein setting the secondary indicators indicates that the secondary operations have completed. In an embodiment of the present invention, the method further includes: based on an operation of the secondary operations being completed, removing, by the processor, the operation from the ordered list. In an embodiment of the present invention, the method also includes: based on the asynchronous operation being completed, removing, by the processor, the information about the asynchronous operation from the stack.

Additional features and advantages are realized through the techniques described herein. For example, in an embodiment of the present invention, the determining that the primary operation can be completed further comprises: assessing, by the processor, the secondary indicators and determining that the secondary operations have completed. Also, in an embodiment of the present invention, the determining that the primary operation can be completed further comprises: determining, by the processor, that the secondary operations have been removed from the ordered list.

In an embodiment of the present invention, the secondary operations further comprise a synchronous operation. In an embodiment of the present invention, the primary operation comprises a synchronous application programming interface call, and wherein the secondary operations each comprise one of: a synchronous application programming interface calls or an asynchronous application programming interface call. In an embodiment of the present invention, the plurality of operations are represented using a program code language utilized for synchronous operations.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures. It should be understood that the Figures are merely schematic and are not drawn to scale.

The present invention relates to the field of asynchronous systems, and more particularly, to catering for synchronous operations in an asynchronous system. Reference to a 'synchronous' operation or call may be taken to refer to a function that can only finish when all operations/functions it has called have completed. Conversely, reference to an 'asynchronous' operation or call may refer to a function that completes at some future point in time.

Embodiments of the present invention provide aspects for converting or translating synchronous operation calls into asynchronous operation calls. Put another way, embodiments of the present invention provide certain aspects of enabling synchronous operations in an asynchronous system by using a data structure comprising an ordered list adapted to store a plurality of operations in an order of invocation. An entry in the list may be adapted to store a primary synchronous operation, and additional entries in the list may be adapted to store secondary operations. In an embodiment of the present invention the additional entries comprise at least one asynchronous secondary operation required to be completed for the primary synchronous operation to complete. The data structure may also employ a stack adapted to store information about the primary synchronous operation and adapted to store information about the at least one asynchronous secondary operation. It may be determined if the primary synchronous operation can be completed based on the content of the stack. Thus, proposed concepts may employ the properties of an ordered list and a stack in a single data structure which enables the monitoring or determination that asynchronous tasks or operations have finished their execution. Such an approach may enable synchronous operation calls of a first programming language to be exposed as asynchronous operation calls of a second programming language, thereby enabling conversion or interoperability between programming languages.

Embodiments of the present invention may utilize the combination of an ordered list with an operations stack to provide a tracking/monitoring ability that may be used to determine when one or more operations have completed.

Figure 1:
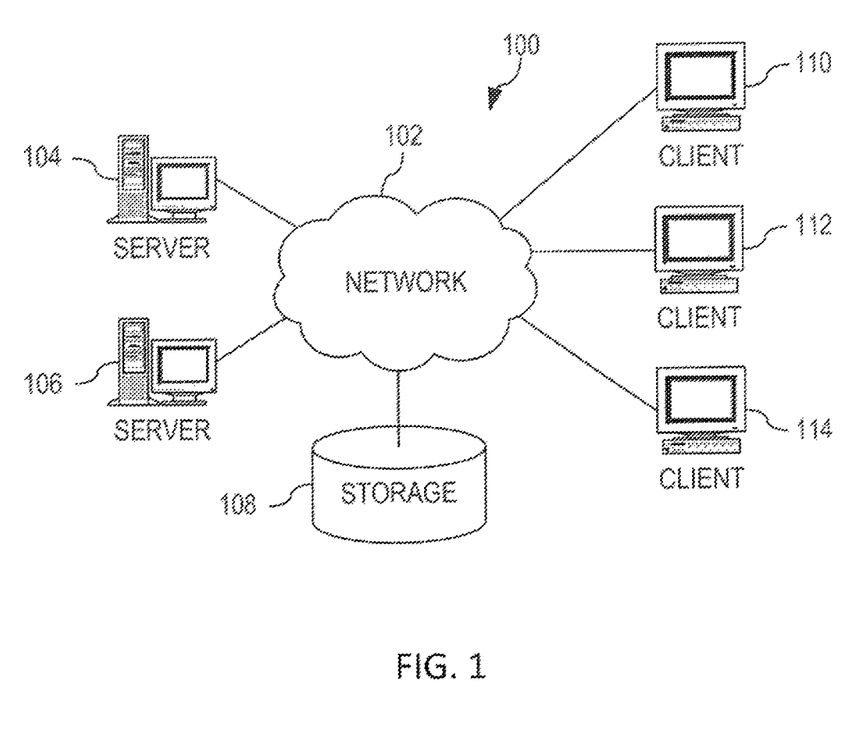
FIG. 1 depicts a representation of an example of a distributed data processing system into which aspects of some embodiments of the present invention may be implemented.
Figure 2:
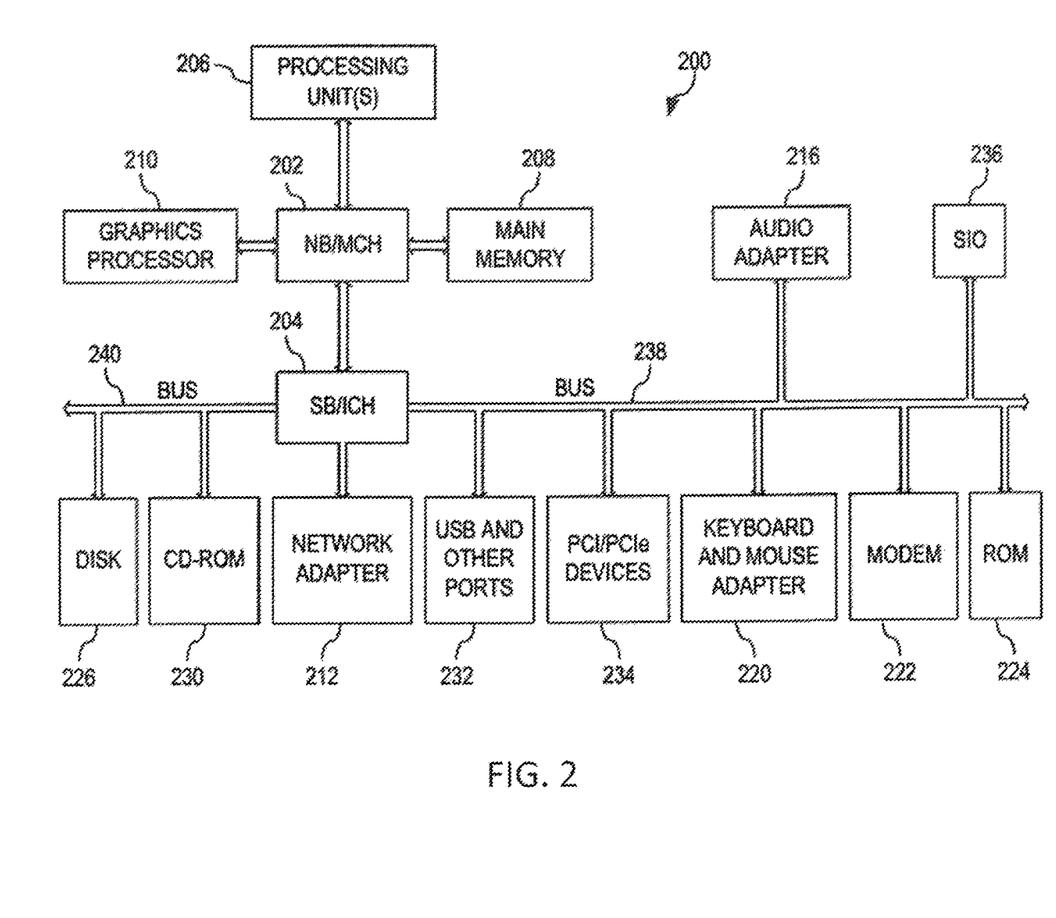
FIG. 2 is a block diagram of an example data processing system into which aspects of some embodiments of the present invention may be implemented.

Embodiments of the present invention may be utilized in many different types of data processing environments. In order to provide a context for the description of elements and functionality of the embodiments of the present invention, FIGS. 1 and 2 are provided hereafter as example environments in which aspects of embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of embodiments of the present invention may be implemented. Distributed data processing system 100 may include a network of computers in which aspects of certain embodiments of the present invention may be implemented. The distributed data processing system 100 contains at least one network 102, which is the medium used to provide communication links between various devices and computers connected together within distributed data processing system 100. The network 102 may include connections, such as wire, wireless communication links, and/or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed data processing system 100 may include additional servers, clients, and other devices not shown.

In the depicted example, the distributed data processing system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which embodiments of the present invention may be implemented.

FIG. 2 is a block diagram of an example data processing system 200 in which aspects of embodiments of the present invention may be implemented. The data processing system 200 is an example of a computer, such as client 110 in FIG. 1, in which computer usable code or instructions implementing the processes of embodiments of the present invention may be located.

In the depicted example, the data processing system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on the processing unit 206. The operating system coordinates and provides control of various components within the data processing system 200 in FIG. 2. As a client, the operating system may be a commercially available operating system. An object-oriented programming system, such as the Java' programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. The data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. Similarly, one or data structures according to an embodiment may be adapted to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as first bus 238 or second bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems, including client computing devices, server computing devices, a tablet computer, laptop computer, telephone or other communication device, a personal digital assistant (PDA), or the like. In some illustrative examples, the data processing system 200 may be a portable computing device that is configured with flash memory to provide non-volatile memory for storing operating system files and/or user-generated data, for example. Thus, the data processing system 200 may essentially be any known or later-developed data processing system without architectural limitation.

Aspects of some embodiments of the present invention may enhance a data processing system (such as that depicted in FIG. 2) by providing for the inter-operability of synchronous operation calls with asynchronous operation calls. These aspects may enable synchronous operation calls of a first programming language (such as Java™ APIs) to be exposed as asynchronous operation calls of a second programming language (such as Javascript APIs), thereby catering for conversion between programming languages.

An embodiment of the present invention combines the properties of a stack and random-access ordered list into a single data structure that may be used to monitor API invocations and to provide notifications to registered listening/monitoring components that asynchronously scheduled tasks have finished their execution. Using such a data structure, embodiments of the present invention may employ the concept of pushing API invocations onto the stack as they are scheduled (e.g., in an order defined by the ordered list), but then removing them from the ordered list in the order in which they complete (which may differ from the order in which they were invoked).

Embodiments of the present invention may therefore provide the advantage that an API writer does not need to know which APIs are invoked as part of its own invocation. Embodiments of the present invention may also avoid the need for additional constructs in either of the (synchronous or asynchronous) programming languages to cope with this situation. Also, embodiments of the present invention may be able to handle nested invocation structures where further API calls are also synchronous, but contain asynchronous invocations.

Figure 3:
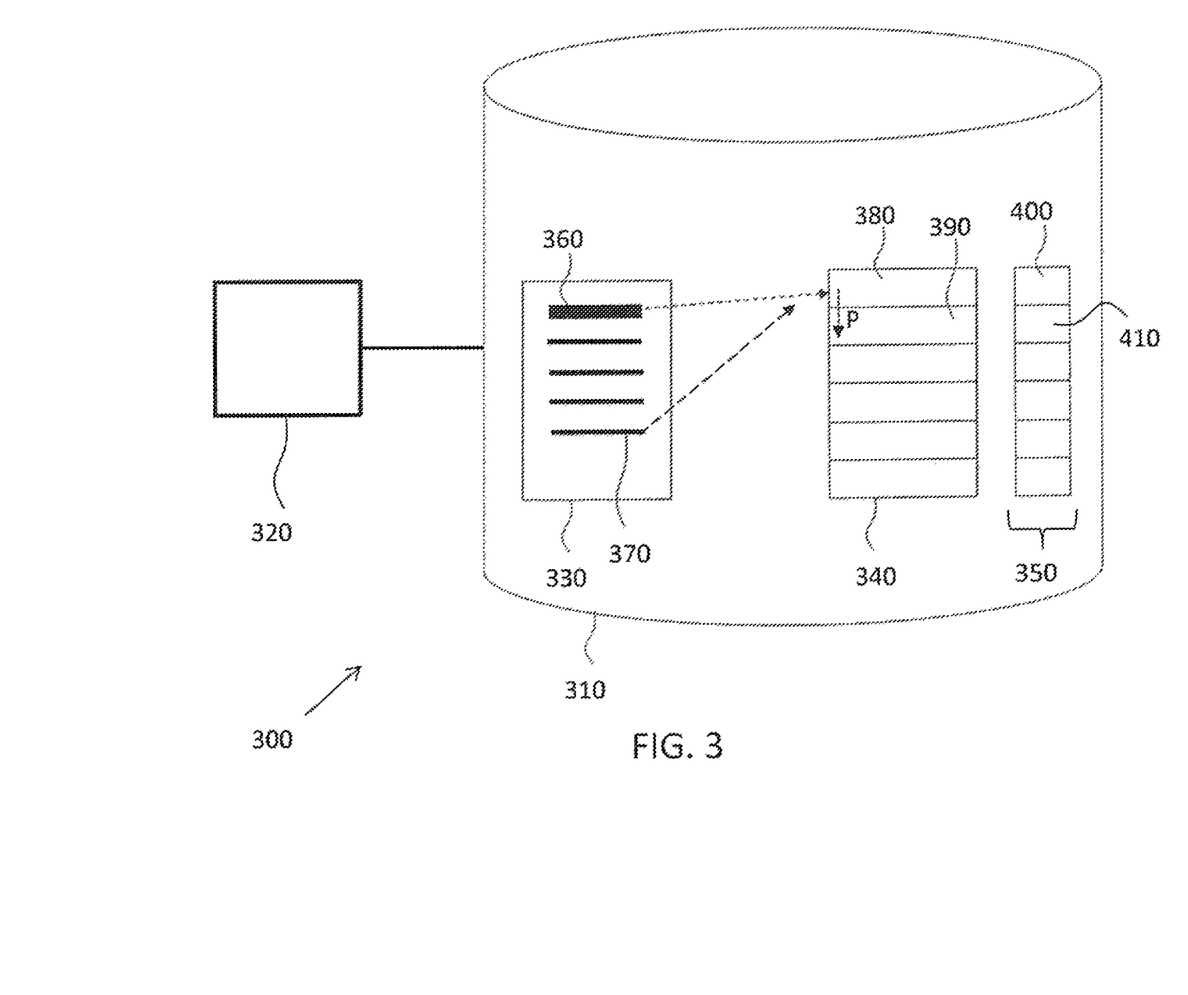
FIG. 3 is a schematic block diagram of a system for converting asynchronous operations into synchronous operations according aspects of some embodiments of the present invention.

With reference to FIG. 3, a system 300 for converting asynchronous operations into synchronous operations may comprise a data store 310 and a processing unit 320 adapted to have access to data stored in the data store 310.

The data store 310 stores a data structure according to an embodiment of the present invention. In this embodiment, the data structure comprises: an ordered list 330 for storing a plurality of operations in an order of invocation; a stack 340; and a plurality of indicators 350 for indicating that an associated operation has completed.

The ordered list comprises a plurality of ordered entries from first to last, wherein the ordering of the entries defines the order of invocation. The first entry 360 in the list comprises a primary synchronous operation 360 (e.g., a synchronous API call), and subsequent entries 370 in the list comprise secondary operations 370 including at least one asynchronous secondary operation (e.g., an asynchronous API call) to be completed for the primary synchronous operation 360 to complete. Thus, according to the invocation order, the primary synchronous operation 360 in the first entry of the list is the first operation to be invoked.

The stack 340 is a program stack which has a top level 380 and a plurality of lower levels 390 adapted for storing information about operations.

The processing unit 320 invokes operations in the ordered list 330 according to the order of invocation. The processing unit 320 then stores information about the primary synchronous operation 360 in the top level 380 of a stack 340 in response to invoking the primary synchronous operation 360. Further, in response to subsequently invoking an asynchronous secondary operation 370, the processing unit 320 is adapted to store information about the asynchronous secondary operation 370 in the stack 340. The storing of this information pushes information about the asynchronous secondary operation 370 to the top level 380 of the stack 340, thus pushing information about the primary synchronous operation 360 from the top level 380 of the stack 340 to a lower level 390 of the stack (as illustrated by the arrow labeled "P" in FIG. 3).

When the asynchronous secondary operation 370 completes, the information about the asynchronous secondary operation 370 is removed from the stack, and the information about the primary synchronous operation 360 is popped back up from the lower level 390 to the top level 380 of the stack 340.

Thus, based on the content of the stack 340, the processing unit 320 may determine if the primary synchronous operation 360 can be completed.

Additionally, in an embodiment of the present invention, a first (or primary) indicator 400 of the plurality of indicators 350 is adapted to comprise data or a flag for indicating if the primary synchronous operation 360 has completed execution. The processing unit 320 may be arranged to set the primary indicator 400 to indicate that the primary synchronous operation has completed in response to determining that the primary synchronous operation can be completed. Similarly, a second (or secondary) indicator 410 of the plurality of indicators 350 may be adapted to comprise data or a flag for indicating if the asynchronous secondary operation 370 has completed execution. The processing unit 320 may be arranged to set the secondary indicator 410 to indicate that the asynchronous secondary operation 370 has completed in response to determining that the asynchronous secondary operation 370 has been (or can be) completed.

Thus, in order to determine if the primary synchronous operation can be completed, the system 300 may assess the secondary indicator 410 for indicating that the asynchronous secondary operation has completed.

Also, in response to the secondary operation 370 being completed, the data store 300 may remove the completed secondary operation 370 from the ordered list 330. The system 300 may therefore be further adapted to determine if the primary synchronous operation 360 can be completed in response to all of secondary operations being removed from the ordered list 330.

Thus, it will be understood that, in the above-described example of FIG. 3, which illustrates the operation of some embodiments of the present invention, the operations may be stored in an ordered list 330 (according to an invocation order), and the operations may comprise a primary synchronous operation 360 and an asynchronous secondary operation 370 and asynchronous secondary operation 370 is used by the primary synchronous operation 360. The operations may then be invoked in the invocation order defined by the list 330. Upon invocation, the primary synchronous operation 360 may be pushed to the stack 340. Similarly, the subsequently invoked asynchronous secondary operation(s) 370 may be pushed to the stack 340. Aspects of embodiments of the present invention may then determine whether the primary synchronous operation 360 can be completed based on the asynchronous secondary operation(s) in the stack 340. In this way, synchronous operations may be exposed as asynchronous operations, thus providing for conversion into an asynchronous communication model.

An embodiment of the present invention, including the embodiments illustrated in FIG. 3, may also employ the unordered access/removal of items (e.g., operations) from the ordered list 330 as and when they complete. For example, functions or operations may be towards the end of the ordered list, but then removed from the list in the order that they complete (which may be different from the order in which they were invoked). In this way, if a synchronous call is at the end of the ordered list, then it can be allowed to complete. This may provide for monitoring or tracking of when functions complete. For example, in a multi-threaded system, there may be lots of operations executing at the same time, and it may be desired to know when particular operations complete. By monitoring when operations are removed from the ordered list, there may be provided a way to assess when operations complete. Thus, the step of determining if the primary synchronous operation may, for instance, be undertaken in response to all of secondary operations being removed from the ordered list.

Some embodiments of the present invention may therefore be thought of as using the combination of an ordered list with random access/removal of items from the list, in order to provide a tracking/monitoring functionality that may be used to monitor when operations complete.

Figure 4:
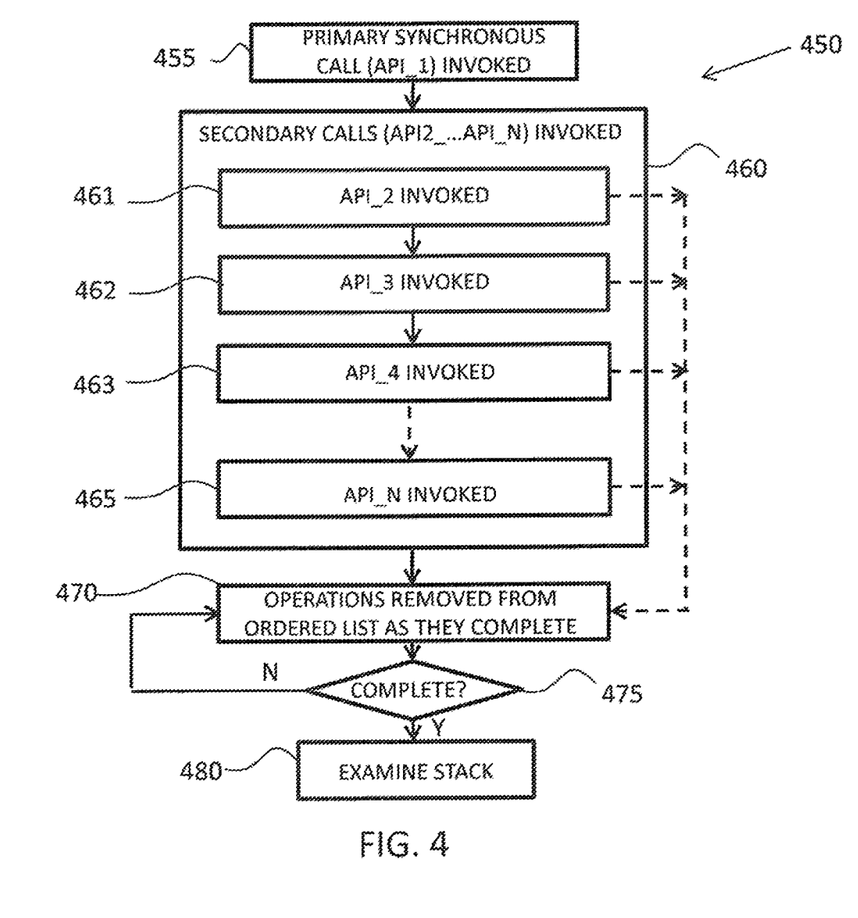
FIG. 4 is a flow diagram of an implementation of a computer-implemented method according to an embodiment of the present invention.

Turning now to FIG. 4, an embodiment of the present invention that includes the implementation of a computer-implemented method 450 will now be described. The implementation of the embodiment uses the following actors:

The JavaScript kernel: for bridging Java and JavaScript and invokes functions in both languages;

API_1: first API provider which is a (primary) synchronous call that can complete only when all asynchronous calls have completed. In this example, it is provided at the first entry in an ordered list of API calls.

API_2 . . . N: additionally installed APIs that provide a number of (secondary) synchronous or asynchronous calls. In this example, these API calls are provided as subsequent entries in the ordered list, and in numerical order, i.e., 2 through to N.

In an embodiment of the present invention, API_1 invokes the kernel to make a callback from Java to JavaScript for a synchronous function (455). Here, the kernel creates a new stack and registers a call completion listener (e.g., a completion indicator) for this entry. The kernel then starts executing the JavaScript code to invoke the (secondary) synchronous or asynchronous calls API_2 . . . N (460).

The (secondary) synchronous or asynchronous calls are invoked (460). Invoking these (secondary) synchronous or asynchronous calls (460) includes invoking subroutines API_2 . . . N are (461 to 465).

For example, API_2 (which is asynchronous) is invoked (461). Here, the kernel pushes the API_2 invocation onto the stack and registers a call completion listener for this entry (if supplied).

Based on invoking API_2 (461), in the non-limiting example depicted in FIG. 4, the next API call in the ordered list, API_3 (which is synchronous in this example), is invoked (462). Here, the API_3 invocation is not pushed onto the stack by the kernel (462).

Based on invoking API_3 (462), in the non-limiting example depicted in FIG. 4, the next API call in the ordered list, API_4 (which is asynchronous in this example), is invoked (463). Here, the kernel pushes the API_4 invocation onto the stack and registers a call completion listener for this entry (if supplied) (463).

In an embodiment of the present invention, each API call in the ordered list is invoked (in the invocation order defined by the ordered list) until the last API call, namely API_N is invoked asynchronously (465). The kernel pushes the API_N invocation onto the stack and registers a call completion listener for this entry (if supplied) (465).

In an embodiment of the present invention, after all of the APIs have been called (460), the operations run and as the APIs complete, they are removed from the ordered list (470). This process of updating the ordered list as the operations complete is indicated by the dashed lines in FIG. 4 which update the ordered list (470) via the APIs' respective completion listener.

In an embodiment of the present invention, the method then checks whether the (secondary) API calls (i.e. API_2 . . . N) have been removed from the ordered list (475). If the at least one (secondary) API call remains in the ordered list, the method returns to running and completing operations (470).

In an embodiment of the present invention, if the method determines that all of the (secondary) API calls API_2 . . . N have been removed from the ordered list (475), the kernel checks the stack to determine if the (primary) synchronous call API_1 can be completed (480). In an embodiment of the present invention, the kernel may examine/check the top level of the stack to see if it contains the information relating to the (primary) synchronous call API_1. For instance, if the top level of the stack contains the (primary) synchronous call API_1 information pushed to the stack, the kernel may determine that all asynchronously queued (secondary) calls have completed and the top level (primary) synchronous call can be completed. Accordingly, if the top level of the stack has a call completion listener (as detailed in step 455), it may be invoked to indicate that the top level (primary) synchronous call may be completed.

Figure 5:
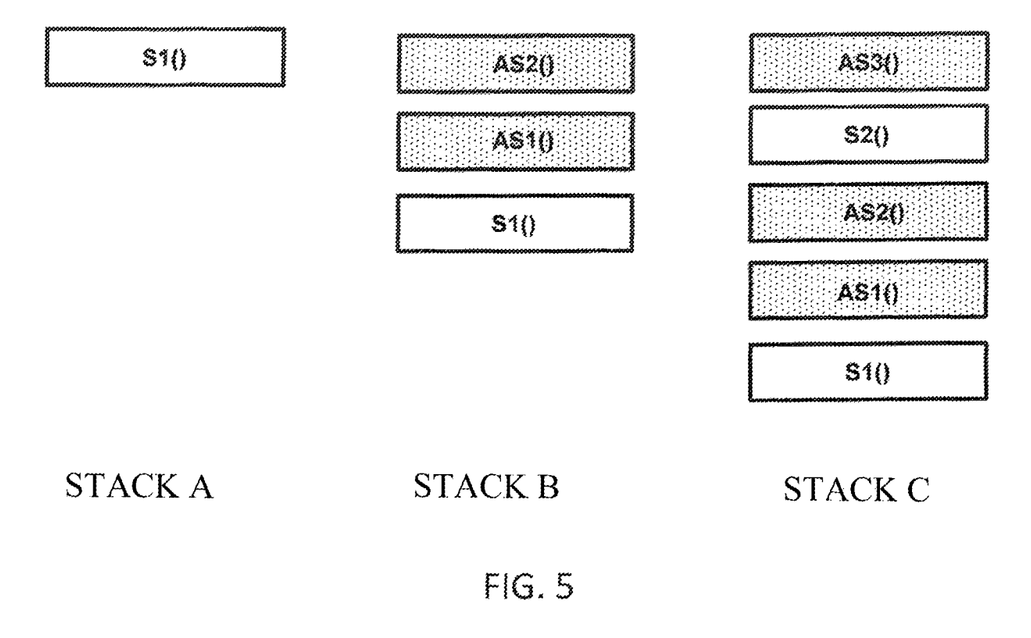
FIGS. 5-6 are schematic diagrams illustrating how a stack changes when exemplary pseudo code is executed in accordance with aspects of some embodiments of the present invention.
Figure 6:
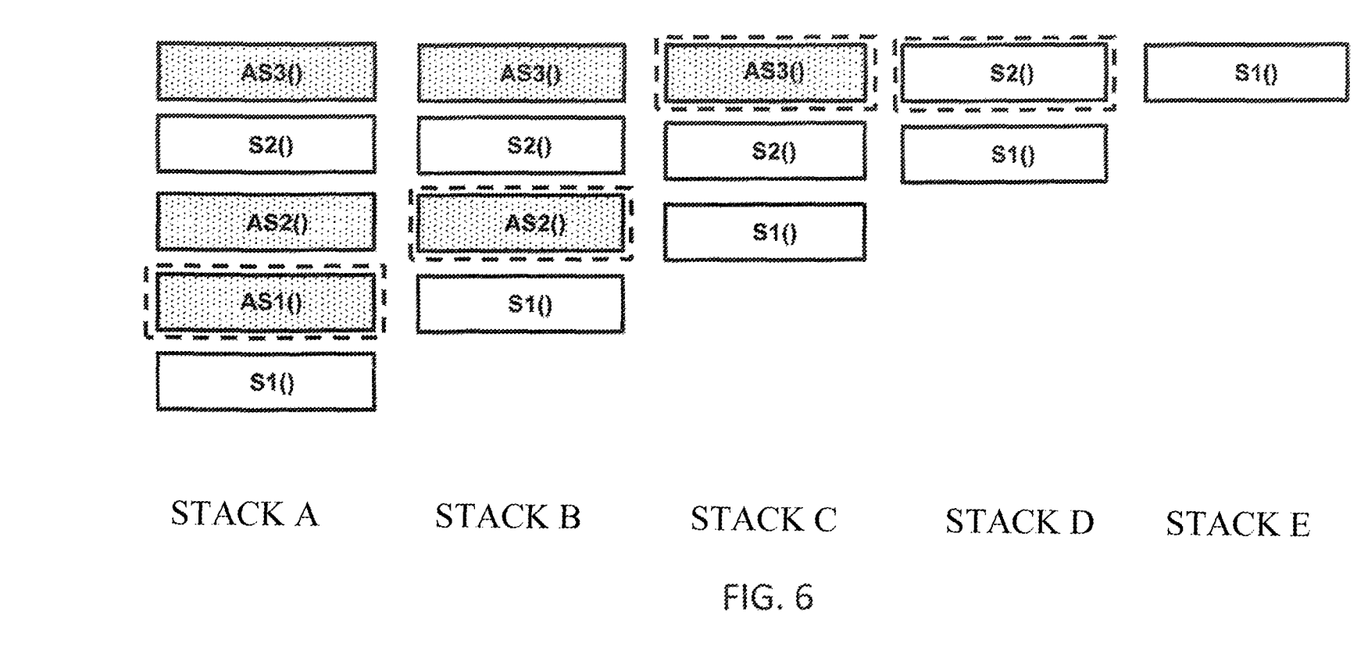

As illustrated by FIGS. 5 and 6, embodiments of the present invention may include a stack and may implement changes to the stack when executing certain program instructions, including but not limited to, the pseudo code below. FIGS. 5 and 6 illustrate non-limiting examples of these changes.

function S1( ) {call function AS1( ); call function AS2( )}
function AS(1) {call function S2( )}
function S2( ) {call function AS3( )}, wherein Sn( ) denotes a synchronous function and ASn( ) denotes an asynchronous function.

In accordance with the pseudo code, first synchronous function S1( ) is initially called and S1( ) is added/pushed to the top of the stack, as depicted as the stack labeled Stack A in FIG. 5.

As it will be understood from the definition of function S1( ) above, function S1( ) calls first asynchronous function AS1( ) and then calls second asynchronous function AS2( ). The first asynchronous function AS1( ) is therefore added to the top of the stack, and then the second asynchronous function AS2( ) is subsequently added to the top of the stack, thus resulting in the stack as depicted as Stack B in FIG. 5.

In accordance with the definition of the first and second asynchronous functions AS1( ) and AS2( ) given above, the first asynchronous function AS1( ) calls second synchronous function S2( ) and the second asynchronous function AS2( ) calls third asynchronous function AS3( ). The second synchronous function S2( ) is therefore added to the top of the stack, and then the third asynchronous function AS3( ) is subsequently added to the top of the stack, thus resulting in the stack as depicted as Stack C in FIG. 5.

In an embodiment of the present invention, functions are removed from the stack as they complete. Thus, turning to FIG. 6, an example of how the stack may alter as the functions complete in accordance with aspects of some embodiments of the present invention will now be described.

By way of illustration, when a function completes it is signified in FIG. 6 by a dashed box surrounding the function. Thus, as depicted in Stack A of FIG. 6, the first asynchronous function AS1( ) is the first function to complete. This is removed from the stack thus resulting in a stack structure as depicted in Stack B.

Stack B also illustrates that the second asynchronous function AS2( ) is the next function to complete. Accordingly, this is removed from the stack thereby resulting in a stack structure as depicted in Stack C.

Stack C also illustrates that the third asynchronous function AS3( ) is the next function to complete. Accordingly, the third asynchronous function AS3( ) is removed from the stack thus resulting in a stack structure as depicted in Stack D. At this point, because the second synchronous function S2( ) is at the top level of the stack, it can now complete. In this example implementation, this indication may be provided by invoking a listener (e.g., an indicator) and telling it that all functions required for the second synchronous function S2( ) are now complete.

Accordingly, Stack D of FIG. 6 illustrates that the second synchronous function S2( ) is the next function to complete. The second synchronous function S2( ) is then removed from the stack thus resulting in a stack structure as depicted in FIG. 6E. At this point, because the first synchronous function S1( ) is at the top level of the stack, it can now complete. Again, this indication may be provided by invoking a listener (e.g., an indicator) and telling it that all functions required for the first synchronous function S1( ) are now complete.

An embodiment of the present invention includes a computer-implemented method for catering for synchronous operations in an asynchronous system, the method comprising: storing, in an order of invocation, a plurality of operations in an ordered list, the first entry in the list being a primary synchronous operation, and subsequent entries in the list being secondary operations comprising at least one asynchronous secondary operation required to be completed for the primary synchronous operation to complete; in the order of invocation, invoking the plurality of operations in the ordered list; in response to invoking the primary synchronous operation, storing information about the primary synchronous operation in a stack; in response to invoking the at least one asynchronous secondary operation, storing information about the at least one asynchronous secondary operation in the stack; and based on the content of the stack, determining if the primary synchronous operation can be completed.

An embodiment of the present invention includes an aspect that includes storing operations in an ordered list, the operations comprising a primary synchronous operation and an asynchronous operation used by the primary. The operations may then be invoked in the order of the list and the primary operation pushed to the stack along with asynchronous secondary operations. An aspect of an embodiment of the present invention may include determining whether the primary synchronous operation can then completed based on the asynchronous secondary operation(s) in the stack. Through this determination, synchronous operations may be exposed as asynchronous operations, thus providing for conversion or translation into an asynchronous communication model. Certain aspects of some embodiments of the present invention enabled the interaction or inter-operability of synchronous and asynchronous operations.

Embodiments of the present invention may employ the combination of an ordered list and random access/removal of items from the list. This combination can be utilized for tracking and observing when functions complete. This aspect of some embodiments of the present invention is advantageous in a multi-threaded system, for example, because there may be lots of things happening at the same time in this system, and it may be desired to know when certain items complete, and that completion can be in any order.

In an embodiment of the present invention, functions or operations may be to the end of the ordered list, but then removed from the list in the order that they complete. In this way, if a synchronous call is at the end of the ordered list, then it can be allowed to complete. Employment of an ordered list therefore enables tracking to be undertaken correctly.

Embodiments of the present invention may further include: associating the primary synchronous operation with a primary indicator for indicating that the primary synchronous operation has completed; and in response to determining that the primary synchronous operation can be completed, setting the primary indicator to indicate that the primary synchronous operation has completed. Thus, an indicator (e.g., call completion object/entry) may be employed to indicate when the primary synchronous operation is completed. The primary indicator (e.g., completion indicator, callback, listener, etc.) may be set by the synchronous operation call and made specific to that operation. Other operations may later be put on the stack, so there may be times when the primary indicator this isn't at the top of stack, but notification may occur when it is once again at the top of the stack.

Embodiments may further comprise: associating the at least one asynchronous secondary operation with a respective at least one secondary indicator for indicating that the at least one asynchronous secondary operation has completed.

In an embodiment of the present invention, determining if the primary synchronous operation can be completed may include assessing the at least one secondary indicator for indicating that the at least one asynchronous secondary operation has completed. Embodiments of the present invention may employ a completion indicator for the asynchronous operations in the stack, and use this indicator to assess if the primary synchronous operation may be completed.

To accommodate when the secondary operations includes a synchronous secondary operation, some embodiments of the present invention may include, in response to invoking the synchronous secondary operation, storing information about the synchronous secondary operation in the stack. In this way, if a secondary synchronous operation is performed, it may be added to the stack in the same way so that it can be correctly completed. Embodiments of the present invention may therefore allow an arbitrary stacking of any number of synchronous and asynchronous operations.

Embodiments of the present invention may further include, in response to a secondary operation being completed, removing the completed secondary operation from the ordered list. Embodiments of the present invention may determine if the primary synchronous operation can be completed in response to all of secondary operations being removed from the ordered list. An embodiment of the present invention may remove operations from the list when they complete, and then check for completion of the primary operation once, as the second operations have been removed from the list. This aspect of some embodiments of the present invention may be advantageous as it may eliminate checking for completion of the primary operation too early as only a check may be needed to see if the synchronous operation is at the top of the stack/last item in the ordered list. Also, in an embodiment of the present invention, in response to a secondary operation being completed, the information about the secondary operation may be removed from the stack. This removal may alter the position of information in the stack, thereby enabling assessment of whether an operation has completed by checking the location of information in the stack. Thus, the position of content in the stack may be used to determine if the primary synchronous operation may be completed, for example.

In some embodiments of the present invention, the primary synchronous operation may comprise a synchronous application programming interface, API, call, and the secondary operations may comprise synchronous or asynchronous API calls.

In an embodiment of the present invention, the plurality of operations may be represented using a program code language that allows or caters for synchronous operations, such as Java, for example. Existing synchronous operations or API calls (such as Java™ APIs) may therefore be exposed as asynchronous operations or API calls, thereby providing for conversion into an asynchronous event model for use with JavaScript, for example.

Further embodiments of the invention include a computer program product for catering for synchronous operations in an asynchronous system, the computer program product comprising a computer readable storage medium having program instructions embodied therewith, the program instructions executable by a processing unit to cause the processing unit to perform a method comprising: storing, in an order of invocation, a plurality of operations in an ordered list, the first entry in the list being a primary synchronous operation, and subsequent entries in the list being secondary operations comprising at least one asynchronous secondary operation required to be completed for the primary synchronous operation to complete; in the order of invocation, invoking the plurality of operations in the ordered list; in response to invoking the primary synchronous operation, storing information about the primary synchronous operation in a stack; in response to invoking the at least one asynchronous secondary operation, storing information about the at least one asynchronous secondary operation in the stack; and based on the content of the stack, determining if the primary synchronous operation can be completed.

Some embodiments of the present invention include a data structure for accommodating synchronous operations in an asynchronous system, the data structure comprising: an ordered list adapted to store a plurality of operations in an order of invocation, the first entry in the list being adapted to store a primary synchronous operation, and subsequent entries in the list being adapted to store secondary operations comprising at least one asynchronous secondary operation required to be completed for the primary synchronous operation to complete; and a stack adapted to store information about the primary synchronous operation and adapted to store information about the at least one asynchronous secondary operation.

Embodiments of the present invention may include the implementation of the stack and an ordered list in the same data structure.

In an embodiment of the present invention, the primary synchronous operation may comprise a synchronous application programming interface, API, call, and the secondary operations may comprise synchronous or asynchronous API calls.

In an embodiment of the present invention, the primary synchronous operation may be associated with an indicator for indicating that the primary synchronous operation has completed.

In an embodiment of the present invention, the data structure may further comprise a primary indicator for indicating that the primary synchronous operation has completed. Also, embodiments of the present invention may further comprise at least one secondary indicator for indicating that the at least one asynchronous secondary operation has completed.

Embodiments of the invention include a system for catering for synchronous operations in an asynchronous system or model, the system comprising: a data store adapted to store a data structure comprising: an ordered list for storing a plurality of operations in an order of invocation, the first entry in the list being a primary synchronous operation, and subsequent entries in the list being secondary operations comprising at least one asynchronous secondary operation required to be completed for the primary synchronous operation to complete; and a stack for storing information about the primary synchronous operation and for storing information about the at least one asynchronous secondary operation; and a processing unit adapted to invoke operations in the ordered list in the order of invocation, to store information about the primary synchronous operation in the stack in response to invoking the primary synchronous operation, and to store information about the at least one asynchronous secondary operation in the stack in response to invoking the at least one asynchronous secondary operation, wherein the system is adapted to determine if the primary synchronous operation can be completed based on the content of the stack.

In some embodiments of the present invention, the data store may be further adapted to store a primary indicator for indicating that the primary synchronous operation has completed, and the system may be adapted to set the primary indicator to indicate that the primary synchronous operation has completed in response to determining that the primary synchronous operation can be completed.

In an embodiment of the present invention, the data store may be further adapted to store at least one secondary indicator for indicating that the at least one asynchronous secondary operation has completed, and the system may be adapted to assess the at least one secondary indicator for indicating that the at least one asynchronous secondary operation has completed in order to determine if the primary synchronous operation can be completed.

In an embodiment of the present invention, the secondary operations may comprise a synchronous secondary operation, and the system may be further adapted to store information about the synchronous secondary operation in the stack in response to the processing unit invoking the synchronous secondary operation.

In an embodiment of the present invention, the data store may be adapted to, in response to a secondary operation being completed, remove the completed secondary operation from the ordered list. Some embodiments of the present invention may be further adapted to determine if the primary synchronous operation can be completed in response to all of secondary operations being removed from the ordered list.

In an embodiment of the present invention, the primary synchronous operation may comprise a synchronous application programming interface, API, call, and the secondary operations may comprise synchronous or asynchronous API calls.

Figure 7:
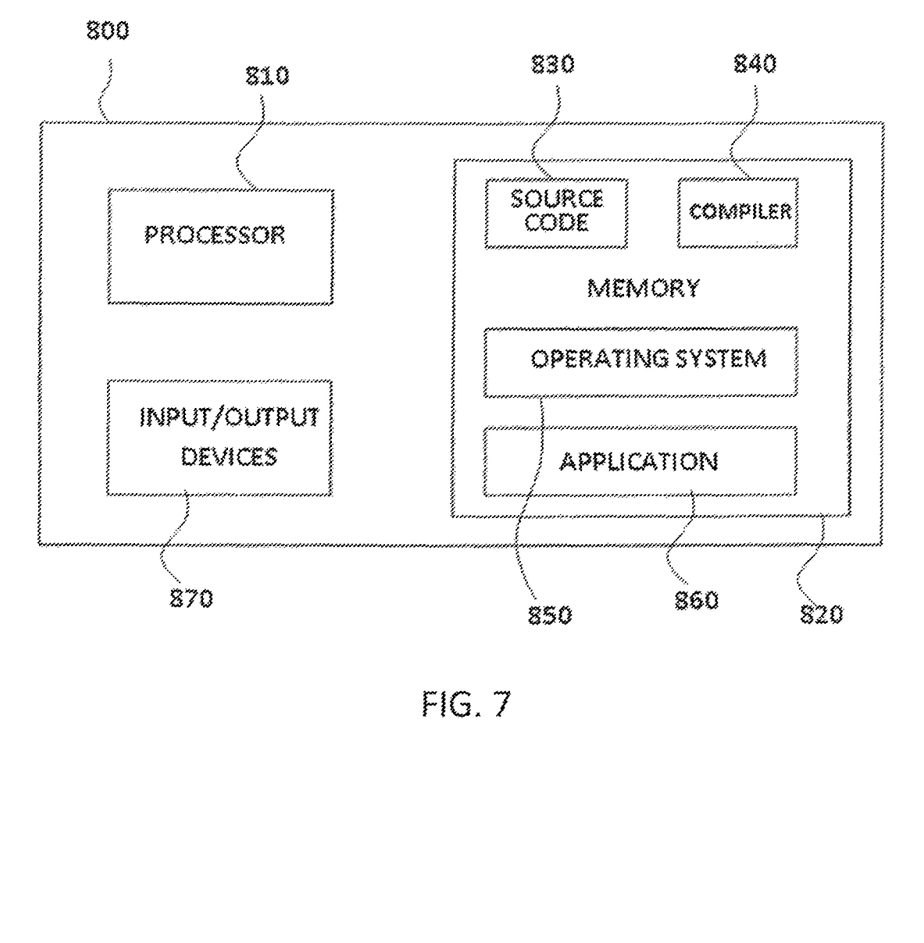
FIG. 7 illustrates an example of a computer within which one or more aspects of an embodiment of the present invention may be employed.

FIG. 7 illustrates an example of a computer 800 within which one or more parts of an embodiment may be employed. Various operations discussed above may utilize the capabilities of the computer 800. For example, one or more parts of a system for converting synchronous operations into asynchronous operations may be incorporated in any element, module, application, and/or component discussed herein.

The computer 800 includes, but is not limited to, PCs, workstations, laptops, PDAs, palm devices, servers, storages, and the like. Generally, in terms of hardware architecture, the computer 800 may include one or more processors 810, memory 820, and one or more I/O devices 870 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 810 is a hardware device for executing software that can be stored in the memory 820. The processor 810 can be virtually any custom made or commercially available processor, a central processing unit (CPU), a digital signal processor (DSP), or an auxiliary processor among several processors associated with the computer 800, and the processor 810 may be a semiconductor based microprocessor (in the form of a microchip) or a microprocessor.

The memory 820 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 820 may incorporate electronic, magnetic, optical, and/or other types of storage media. Note that the memory 820 can have a distributed architecture, where various components are situated remote from one another, but can be accessed by the processor 810.

The software in the memory 820 may include one or more separate programs, each of which comprises an ordered listing of executable instructions for implementing logical functions. The software in the memory 820 includes a suitable operating system (O/S) 850, compiler 840, source code 830, and one or more applications 860 in accordance with exemplary embodiments. As illustrated, the application 860 comprises numerous functional components for implementing the features and operations of the exemplary embodiments. The application 860 of the computer 800 may represent various applications, computational units, logic, functional units, processes, operations, virtual entities, and/or modules in accordance with exemplary embodiments, but the application 860 is not meant to be a limitation.

The operating system 850 controls the execution of other computer programs, and provides scheduling, input-output control, file and data management, memory management, and communication control and related services. It is contemplated by the inventors that the application 860 for implementing exemplary embodiments may be applicable on all commercially available operating systems.

Application 860 may be a source program, executable program (object code), script, or any other entity comprising a set of instructions to be performed. When a source program, then the program is usually translated via a compiler (such as the compiler 840), assembler, interpreter, or the like, which may or may not be included within the memory 820, so as to operate properly in connection with the O/S 850. The I/O devices 870 may include input devices such as, for example but not limited to, a mouse, keyboard, scanner, microphone, camera, etc. Furthermore, the I/O devices 870 may also include output devices, for example but not limited to a printer, display, etc. Finally, the I/O devices 870 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 870 also include components for communicating over various networks, such as the Internet or intranet.

If the computer 800 is a PC, workstation, intelligent device or the like, the software in the memory 820 may further include a basic input output system (BIOS) (omitted for simplicity). The BIOS is a set of essential software routines that initialize and test hardware at startup, start the O/S 850, and support the transfer of data among the hardware devices. The BIOS is stored in some type of read-only-memory, such as ROM, PROM, EPROM, EEPROM or the like, so that the BIOS can be executed when the computer 800 is activated.

When the computer 800 is in operation, the processor 810 is configured to execute software stored within the memory 820, to communicate data to and from the memory 820, and to generally control operations of the computer 800 pursuant to the software. The application 860 and the O/S 850 are read, in whole or in part, by the processor 810, perhaps buffered within the processor 810, and then executed.

When the application 860 is implemented in software it should be noted that the application 860 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 860 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

In the context of the present application, where embodiments of the present invention constitute a method, it should be understood that such a method is a process for execution by a computer, i.e., is a computer-implementable method. The various steps of the method therefore reflect various parts of a computer program, e.g., various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
storing, by a processor, in an order of invocation, a plurality of operations in an ordered list, wherein the first entry in the ordered list comprises a primary operation and the primary operation is a synchronous operation calling a first group of secondary operations, wherein subsequent entries in the ordered list comprise secondary operations, the secondary operations comprising the first group, operations called by the first group, and operations called by groups of operations subsequent to the first group, in an order of calls starting from the calling by the primary operation, and the secondary operations comprise one or more asynchronous operations, and wherein the secondary operations are required to complete before the primary operation can complete;
invoking, by the processor, in the order of invocation, the plurality of operations;
based on invoking the primary operation, storing, by the processor, as content of a stack, information about the primary operation;
based on invoking the secondary operations, storing, by the processor, as the content of the stack, information about the secondary operations, wherein the information about the secondary operations comprises information about the execution status of the one or more asynchronous operations;
determining, by the processor, that the primary operation can be completed, wherein the determining comprises analyzing a portion of the content of the stack; and
assessing, by the processor, the secondary indicators and determining that the secondary operations have completed;
associating, by the processor, the secondary operations with secondary indicators, wherein setting the secondary indicators comprise the execution status of the secondary operations by indicating that the secondary operations have completed, wherein the secondary operations further comprise a synchronous operation, wherein the one or more asynchronous operations in the secondary operation are required to complete before the synchronous operation can complete.

2. The computer-implemented method of claim 1, further comprising:
associating, by the processor, the primary operation with a primary indicator, wherein setting the primary indicator indicates that the primary operation has completed; and
based on the determining that the primary operation can be completed, setting, by the processor, the primary indicator.

3. The computer-implemented method of claim 1, further comprising:
associating, by the processor, the secondary operations with secondary indicators, wherein setting the secondary indicators comprise the execution status of the secondary operations by indicating that the secondary operations have completed.

4. The computer-implemented method of claim 3, wherein the determining that the primary operation can be completed further comprises:
assessing, by the processor, the secondary indicators and determining that the secondary operations have completed.

5. The computer-implemented method of claim 1, wherein the secondary operations further comprise a synchronous operation, wherein one or more asynchronous operations are required to complete before the synchronous operations can complete.

6. The computer-implemented method of claim 1, further comprising:
based on an operation of the secondary operations being completed, removing, by the processor, the operation from the ordered list.

7. The computer-implemented method claim 6, wherein the determining that the primary operation can be completed further comprises:
determining, by the processor, that the secondary operations have been removed from the ordered list.

8. The computer-implemented method of claim 1, further comprising:
based on each of the asynchronous operations being completed, removing, by the processor, the information about the asynchronous operation from the stack.

9. The computer-implemented method of claim 1, wherein the primary operation comprises a synchronous application programming interface call, and wherein the secondary operations each comprise one of: a synchronous application programming interface calls or an asynchronous application programming interface call.

10. The computer-implemented method of claim 1, wherein the plurality of operations are represented using a program code language utilized for synchronous operations.

11. A computer program product comprising:
a computer readable storage medium readable by a processor and storing instructions for execution by processor for performing a method comprising:
storing, by the processor, in an order of invocation, a plurality of operations in an ordered list, wherein the first entry in the ordered list comprises a primary operation and the primary operation is a synchronous operation calling a first group of secondary operations, wherein subsequent entries in the ordered list comprise secondary operations the secondary operations comprising the first group, operations called by the first group, and operations called by groups of operations subsequent to the first group, in an order of calls starting from the calling by the primary operation, and the secondary operations comprise one or more asynchronous operations, and wherein the secondary operations are required to complete before the primary operation can complete;
invoking, by the processor, in the order of invocation, the plurality of operations;
based on invoking the primary operation, storing, by the processor, as content of a stack, information about the primary operation;
based on invoking the secondary operations, storing, by the processor, as the content of the stack, information about the secondary operations, wherein the information about the secondary operations comprises information about the execution status of the one or more asynchronous operations;
determining, by the processor, that the primary operation can be completed, wherein the determining comprises analyzing a portion of the content of the stack; and
assessing, by the processor, the secondary indicators and determining that the secondary operations have completed;

associating, by the processor, the secondary operations with secondary indicators, wherein setting the secondary indicators comprise the execution status of the secondary operations by indicating that the secondary operations have completed, wherein the secondary operations further comprise a synchronous operation, wherein the one or more asynchronous operations in the secondary operation are required to complete before the synchronous operation can complete.

12. The computer program product of claim 11, the method further comprising:

associating, by the processor, the primary operation with a primary indicator, wherein setting the primary indicator indicates that the primary operation has completed; and based on the determining that the primary operation can be completed, setting, by the processor, the primary indicator.

13. The computer program product of claim 11, the method further comprising:

based on an operation of the secondary operations being completed, removing, by the processor, the operation from the ordered list.

14. The computer program product of claim 13, wherein the determining that the primary operation can be completed further comprises:

determining, by the processor, that the secondary operations have been removed from the ordered list.

15. The computer program product of claim 11, the method further comprising:

based on each of the asynchronous operations being completed, removing, by the processor, the information about the asynchronous operation from the stack.

16. The computer program product of claim 11, wherein the primary operation comprises a synchronous application programming interface call, and wherein the secondary operations each comprise one of: a synchronous application programming interface calls or an asynchronous application programming interface call.

17. A system comprising:

a memory;

a processor in communication with the memory; and program instructions executable by the processor via the memory to perform a method, the method comprising:

storing, by the processor, in an order of invocation, a plurality of operations in an ordered list, wherein the first entry in the ordered list comprises a primary operation and the primary operation is a synchronous operation calling a first group of secondary operations, wherein subsequent entries in the ordered list comprise secondary operations the secondary operations comprising the first group, operations called by the first group, and operations called by groups of operations subsequent to the first group, in an order of calls starting from the calling by the primary operation, and the secondary operations comprise one or more asynchronous operations, and wherein the secondary operations are required to complete before the primary operation can complete;

invoking, by the processor, in the order of invocation, the plurality of operations;

based on invoking the primary operation, storing, by the processor, as content of a stack, information about the primary operation;

based on invoking the secondary operations, storing, by the processor, as the content of the stack, information about the secondary operations, wherein the information about the secondary operations comprises information about the execution status of the one or more asynchronous operations;

determining, by the processor, that the primary operation can be completed, wherein the determining comprises analyzing a portion of the content of the stack; and assessing, by the processor, the secondary indicators and determining that the secondary operations have completed;

associating, by the processor, the secondary operations with secondary indicators, wherein setting the secondary indicators comprise the execution status of the secondary operations by indicating that the secondary operations have completed, wherein the secondary operations further comprise a synchronous operation, wherein the one or more asynchronous operations in the secondary operation are required to complete before the synchronous operation can complete.

18. The system of claim 17, the method further comprising:

associating, by the processor, the primary operation with a primary indicator, wherein setting the primary indicator indicates that the primary operation has completed; and based on the determining that the primary operation can be completed, setting, by the processor, the primary indicator.

* * * * *